United States Patent [19]

Rabbi

[11] Patent Number: 4,733,520
[45] Date of Patent: Mar. 29, 1988

[54] SUPPLY DEVICE WITH AN ECCENTRIC VIBRATING CYLINDRICAL CONTAINER FOR THE SUPPLY OF PRODUCTS TO BE PACKAGED PARTICULARLY BY MACHINES FOR BLISTER PACKAGING

[75] Inventor: Umberto Rabbi, Bologna, Italy

[73] Assignee: I.M.A. Industria Macchine Automatiche-S.p.A., Ozzano Emilia, Italy

[21] Appl. No.: 74,770

[22] Filed: Jul. 17, 1987

[30] Foreign Application Priority Data

Sep. 22, 1986 [IT] Italy ................................ 3509 A/86

[51] Int. Cl.⁴ .......................... B65B 5/04; B65B 47/00
[52] U.S. Cl. ...................................... 53/559; 198/446;
198/757; 221/200; 222/161
[58] Field of Search .................. 53/559, 560; 198/391,
198/446, 757; 221/200; 222/161

[56] References Cited

U.S. PATENT DOCUMENTS

| | | | |
|---|---|---|---|
| 2,718,957 | 9/1955 | Spurlin | 198/757 |
| 2,904,162 | 9/1959 | Simer | 198/391 X |
| 3,280,964 | 10/1966 | Burgess, Jr. | 198/757 |
| 3,568,824 | 3/1971 | Tarzian | 198/757 |

*Primary Examiner*—John Sipos
*Attorney, Agent, or Firm*—Karl F. Ross; Herbert Dubno

[57] ABSTRACT

A supply device with a vibrating cylindrical container for the supply of products, via a multiple channel device, to machines for blister packaging, in which the container has a vertical axis which is eccentric with respect to the vertical axis of the vibrator device and has an annular base which develops in an ascending manner over a first portion starting from the multiple channel device, followed by a second portion which develops conventionally. Guide and flow stop means are provided along the base sections with ascending and conventional development as well as supply means for supplying the products into the peripheral zone of the container and suction means to suction the dust and/or fragments of products below the base of the container at the opposite sides of the multiple channel device.

2 Claims, 3 Drawing Figures

SUPPLY DEVICE WITH AN ECCENTRIC VIBRATING CYLINDRICAL CONTAINER FOR THE SUPPLY OF PRODUCTS TO BE PACKAGED PARTICULARLY BY MACHINES FOR BLISTER PACKAGING

DESCRIPTION

The present invention relates to a supply device with an eccentric vibrating cylindrical container for the supply of products to be packaged, in particular for machines for blister packaging.

According to the prior art, so-called blister packs are obtained in a continuous strip by feeding a strip of heat-deformable material being unwound from a spool along the production line of a packaging machine and subjecting this strip to a series of successive operations along the production line at an equivalent number of stations of the packaging machine.

In accordance, therefore, with a known blister packaging machine, manufactured and sold by applicants under the Trademark IMA C 60, the strip of heat-deformable material is substantially subjected, in the first instance, to a differentiated heating operation and then to the action of punching means which draw the strip, pre-heated in the above manner, for the formation of the blisters designed to contain the individual products to be packaged. The blister strip formed in this way is then caused, as it advances along the production line of the packaging machine, to pass through a station where the products to be packaged are supplied, which products are then inserted individually and progressively in the blisters and, subsequently, through a station for the hermetic sealing of the blisters each containing one of the products to be packaged by the superimposition on the strip of heat-deformable material, shaped and supplied with products to be packaged in the above manner, of a second strip, normally of aluminium, which may be soldered to the first strip of heat-deformable material thus obtaining the continuous strip of blister packs.

The continuous strip of blister packs obained in this way is finally caused to pass through a separation station where, using cutting means, the individual blister packs are rhythmically separated in succession, these packs then being stacked in accordance with the uniform arrangement occupied during the strip separation stage, i.e. conventionally superimposed, so that they can, at the end of the production cycle, be inserted in boxes or containers or supplied to a further machine for further processing.

The station for supplying the products essentially comprises a supply device substantially comprising, in accordance with the prior art, a vibrating cylindrical container with a vertical axis and a multiple channel device communicating with this vibrating cylindrical container and extending downwardly and normally in a transverse plane perpendicular to the direction in which the heat-deformed strip of blisters is fed and terminating slightly above the latter in order to brush against the blisters (see, for example, Italian Patent Specification No. 1 126 233 in the name of the applicants).

The vibrating cylindrical container of these supply devices known up to now has a vertical axis concentric with the vertical axis of the vibrator unit or apparatus as a result of which its use is limited to supply devices with a small number of parallel, adjacent channels.

The object of this invention is to provide a supply device with a vibrating cylindrical container able to supply devices with a comparatively high number of supply channels adjacent to and spaced from one another in a parallel and transverse manner using a cylindrical container having a relatively small diameter.

A further object of the present invention is to provide a supply device with a vibrating cylindrical container designed to supply devices with a comparatively high number of supply channels adjacent to one another in a parallel and transverse manner in accordance with the above object and such as to achieve this possibility of supply in a particularly simple, practical, effective and efficient manner, and in particular in a technically economic manner in relation to the results achieved therewith in practice.

These and other objects described in detail below are all achieved with the supply device with a vibrating cylindrical container for the supply of products to be packaged, particularly designed for machines for blister packaging, to the said vibrating cylindrical container communicating with a device with multiple supply channels, which supply device is characterised in that the vibrating cylindrical container has a vertical axis which is eccentric with respect to the vertical axis of the vibrator unit which supports it and has an annular base developing in a helically ascending manner from a first straight line at which point the vibrating cylindrical container communicates with the said device with multiple supply channels, followed by a portion with a conventional development, and in that respective flow stop and guide means are provided along the portion with an ascending development and guide means are provided along the portion with a conventional development as well as supply and suction means respectively for supplying the product to be packaged to the peripheral zone of the container in which the said flow stop means are located and to suction the dust and/or fragments of product below the base of the container at the opposite sides of the device with multiple supply channels.

Further features and advantages of the supply device with an eccentric vibrating cylindrical container of the invention are illustrated in the following detailed description made with reference to the attached drawings, in which.

Figure 1:
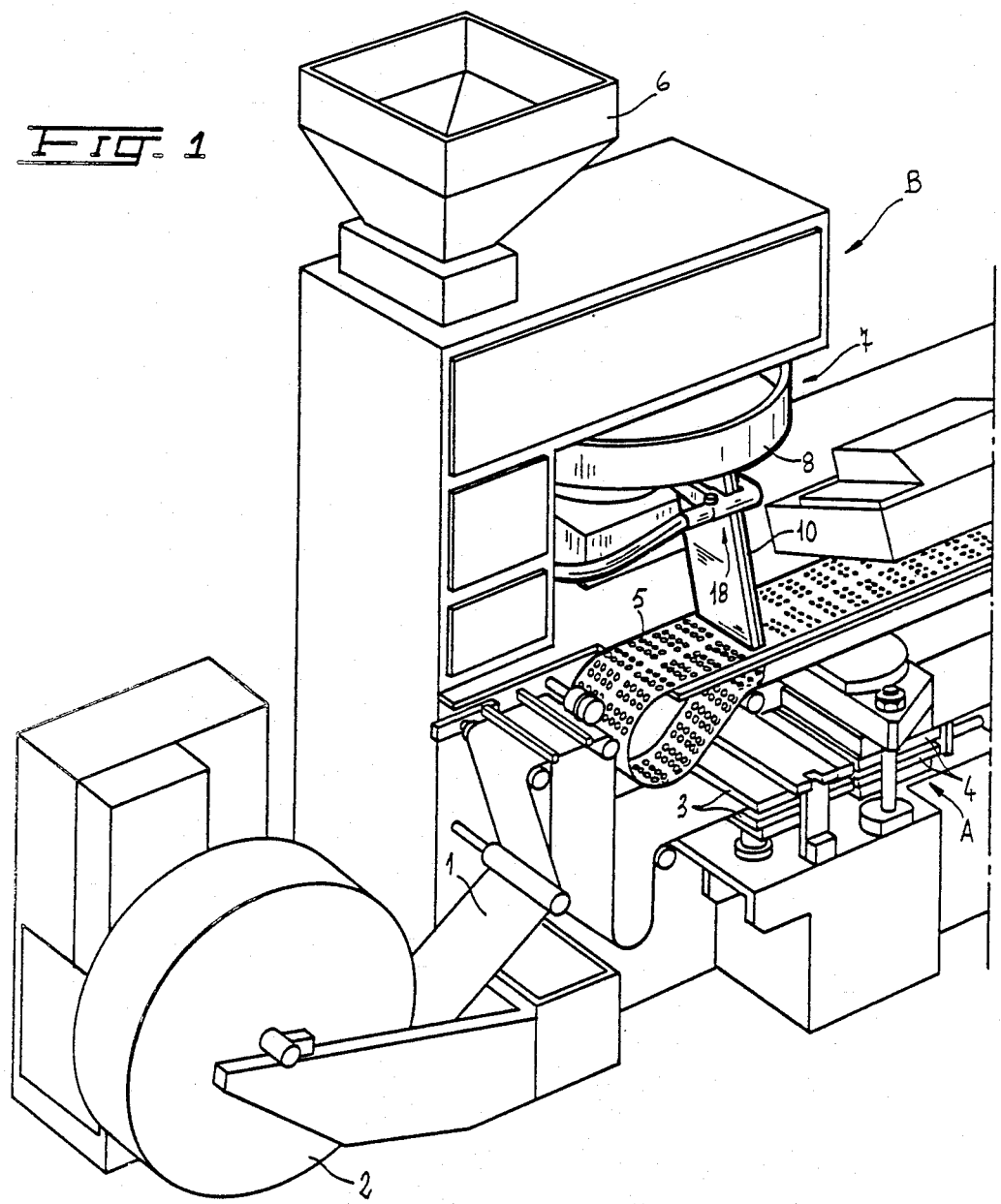
FIG. 1 is a perspective view of the section of the blister packaging machine involved with the supply device for products to be packaged in question.

As stated above, a strip of blister packs produced, for example, by the above-mentioned known packaging machine IMA C 60, part of which is shown diagrammatically in FIG. 1, is obtained by feeding a strip 1 of heat-deformable material being unwound from a spool 2 along the horizontal production line of this packaging machine and subjecting it to a series of successive operations along this production line at an equivalent number of operating stations of this packaging machine, i.e. subjecting it, in the first instance, at a station A to a heating operation using heating plates 3 with a differentiated heating effect, and then to the action of punching means 4 which draw the strip 1 of heat-deformable material, pre-heated in this way, for the formation in the strip 1 of blisters 5, in transverse and respectively longitudinal alignment, designed to contain the individual products (not shown).

The strip 1 of heat-deformable material shaped in this way into blisters 5 is caused, when it is fed along the packaging line of the packaging machine by drive rollers which are not shown in FIG. 1, to pass through a station B for the supply of the products to be packaged, which are progressively and individually inserted into these blisters 5 and, subsequently, through a station (not shown) for the hermetic sealing of the blisters 5 each containing one of the products to be packaged, by the superimposition on the strip 1 of heat-deformable material, shaped and supplied in this way with products to be packaged, of a second strip (not shown), normally of aluminium, which may be soldered to the first strip of heat-deformable material thereby obtaining the continuous strip of blister packs.

This continuous strip of blister packs is then either supplied to a further machine for further processing, or supplied to a further station, not shown in FIG. 1, of the same packaging machine at which it is rhythmically separated, by cutting means, into separate successive blister packs and where these latter are progressively stacked in the uniform arrangement occupied during the separation stage, i.e. conventionally superimposed in stacks, and finally, inserted into containers at a further station (not shown) passing through a prior station where a component relating, for example, to the nature of the product is associated with these stacks.

Figure 2:
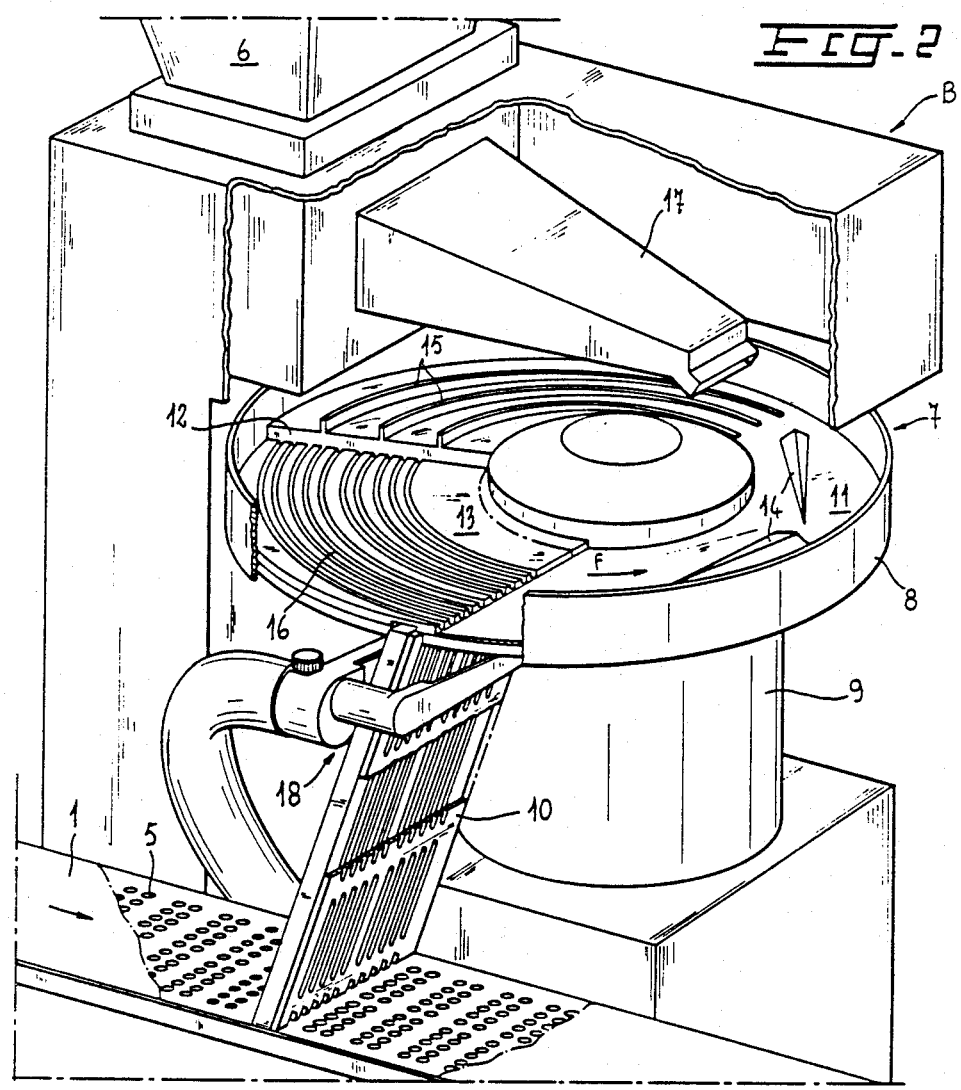
FIG. 2 is a further perspective view, on an enlarged scale, of the supply device of the invention.

The supply station B of a blister packaging machine of this type, shown also in FIG. 2, which is essentially formed by a conventional hopper 6 for the supply of the products to a conventional container-vibrator with associated accessories for the suction of dust and/or fragments of the products to be supplied to the blisters 5 of the heat-deformed strip 1 via a multiple channel device, for example of the type disclosed in a further Patent Application in the name of the applicants, is provided with the eccentric vibrating cylindrical container of the invention shown overall by 7.

The supply device with the vibrating cylindrical container is provided, in accordance with the invention, with the vibrating cylindrical container 8 disposed with its vertical axis eccentric with respect to the vertical axis of the vibrator unit 9 which supports it and with its annular base with a helically ascending development over a first portion from the multiple channel device 10 followed by a second portion with a conventional development. More precisely, this ascending base section or portion 11 begins to ascend from a first straight line lying in the plane of the multiple channel device 10 which is tangential to a circle within the container 8 having its vertical axis concentric with the vertical axis of the vibrator unit 9 and passing though a peripheral point of this container 8 in the base zone of radial width decreasing in the direction of feed of the products being supplied shown by the arrow f.

This ascending base 11 ascends up to a product discharge step 12 which lies at the location of a second straight line converging with the point at which the first straight line is tangential with the circle and passing through a peripheral point of the container 8 close, from upstream, with the point corresponding to the greatest radial.

From this step 12, the base returns to a conventional development, portion 13, up to the first straight line lying in the plane of the multiple channel device 10.

In the ascending base section 11 there are disposed, from upstream to downstream, flow stop means 14 and guide means 15 for the horizontally disposed products, while in the conventionally developing base portion 15 there are disposed guide means 16 for the products disposed sideways.

The supply means 17 communicating with the supply hopper 6 supply the products to the peripheral zone of the eccentric vibrating cylindrical container 8 in the ascending base section 11 and more precisely at the point at which the flow stop means 14 are located, while means 18 are provided to suction the dust and/or fragments of these products below the container 8 on the opposite sides of the multiple channel device 10.

Figure 3:
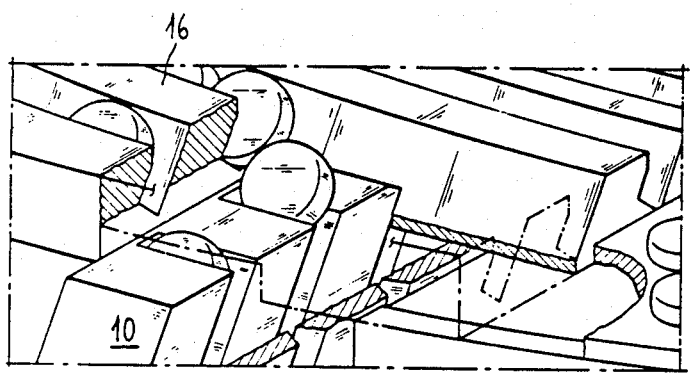
FIG. 3 is a cross-section, on an enlarged scale, of the portion of the supply device which is in an operational relationship with the multiple supply channels.

FIG. 3 shows the passage of the products from the guide means 16 to the supply channels of the multiple channel device 10.

I claim:

1. A supply device with a vibrating cylindrical container for the supply of products to be packaged, particularly designed for blister packaging machines, to the vibrating cylindrical container communicating with a device with multiple supply channels, characterised in that the vibrating cylindrical container has a vertical axis which is eccentric with respect to the vertical axis of the vibrator unit which supports it and has an annular base developing in a helically ascending manner from a first straight line at which point the vibrating cylindrical container communicates with the said device with multiple supply channels, followed by a portion below said annular base leading to said device with multiple supply channels, and in that respective flow stop and guide means are provided along said base with an ascending development for guiding products in multiple rows and guide means are provided along said portion for said multiple row products supply and suction means respectively for supplying the product to be packaged to the peripheral zone of the container in which the said flow stop means are located and to suction the dust and/or fragments of product below the base of the container at the opposite sides of the device with multiple supply channels.

2. A supply device with a vibrating cylindrical container as claimed in claim 1, characterised in that the first straight line at the location of which the vibrating cylindrical container communicates with the device with multiple supply channels is tangential to a circle within the container having its vertical axis concentric with the vertical axis of the vibrator unit and lies in a plane passing though this tangential point with respect to the circle and a peripheral point of this container in the base zone of radial width decreasing in the direction of feed of the products being supplied, up to a discharge step which lies at the location of a second straight line converging with the point at which the first straight line is tangential to the circle passing through a peripheral point of the container close, from upstream, to the point corresponding to the greatest radial and from which step this base has a conventional development up to the first straight line.

* * * * *